(12) United States Patent
Durrant

(10) Patent No.: US 6,338,623 B1
(45) Date of Patent: Jan. 15, 2002

(54) ROTATIONAL MOLDING OVEN

(76) Inventor: Richard A. Durrant, 2391 Jonesville Hwy., Union, SC (US) 29379

( * ) Notice: Subject to any disclaimer, the term of this patent is extended or adjusted under 35 U.S.C. 154(b) by 0 days.

(21) Appl. No.: 09/561,760

(22) Filed: Apr. 29, 2000

(51) Int. Cl.$^7$ .............................. B28B 1/20; B28B 1/54; B28B 21/22
(52) U.S. Cl. ..................... 425/429; 264/310; 425/435
(58) Field of Search .................. 425/429, 435; 264/310

(56) References Cited

U.S. PATENT DOCUMENTS

| | | | |
|---|---|---|---|
| 3,316,339 A | * | 4/1967 | Breneman .................. 264/310 |
| 3,703,348 A | | 11/1972 | Pivar |
| 3,796,533 A | | 3/1974 | Vox |
| 3,799,729 A | * | 3/1974 | Hagen ..................... 425/435 |
| 3,810,727 A | | 5/1974 | Pivar |
| 3,822,980 A | | 7/1974 | Graeper |
| 3,825,395 A | | 7/1974 | Pivar |
| 3,838,964 A | * | 10/1974 | Hake ........................ 425/429 |
| 3,841,821 A | | 10/1974 | Pivar |
| 3,885,016 A | | 5/1975 | Pivar |
| 3,914,105 A | | 10/1975 | Pivar |
| 3,938,928 A | | 2/1976 | Andrews |
| 4,022,564 A | | 5/1977 | Dawson |
| 4,102,624 A | | 7/1978 | Corona |
| 4,247,279 A | * | 1/1981 | Masters .................... 425/430 |
| 4,292,015 A | * | 9/1981 | Hritz ....................... 425/73 |
| 4,486,172 A | | 12/1984 | Dunning |
| 4,583,932 A | | 4/1986 | Meuret |
| 4,632,654 A | | 12/1986 | Lemelson |
| 4,705,468 A | * | 11/1987 | LeBreton .................. 425/116 |
| 4,767,321 A | | 8/1988 | Chilva |
| 4,836,963 A | | 6/1989 | Gilman, Jr. |
| 5,039,297 A | | 8/1991 | Masters |
| 5,094,607 A | * | 3/1992 | Masters .................... 425/429 |
| 5,116,213 A | | 5/1992 | Zilbert |
| 5,423,248 A | | 6/1995 | Smith et al. |
| 5,443,382 A | | 8/1995 | Tsurumi et al. |
| 5,507,632 A | | 4/1996 | Payne |
| 5,554,394 A | | 9/1996 | Feal et al. |
| 5,683,240 A | | 11/1997 | Smith |
| 5,705,200 A | | 1/1998 | Payne |
| 5,807,589 A | | 9/1998 | Defatte |

\* cited by examiner

*Primary Examiner*—Nam Nguyen
*Assistant Examiner*—Emmanuel Luk
(74) *Attorney, Agent, or Firm*—Michael I. Kroll

(57) ABSTRACT

A rotational molding oven for forming an object from a mold. The oven includes a cavity for retaining the mold, a burner for heating the cavity and melting the resin and a device for rocking the mold between −45° and 45° from a horizontal plane. The rocking device is outside, extending into the cavity, maintaining the mold in the center of the cavity. The rocking device facilitates distribution of resin within the mold and improves thermal flow of heat within the cavity thereby increasing thermal efficiency and minimizing the size of the cavity. The rocking device includes a first track outside the cavity, a carriage assembly, a drive assembly connected to the carriage assembly and a guide assembly connected between the first track and carriage assembly for translating up and down the first track, causing the carriage assembly to move therewith and the mold to rock about the central axis of the cavity. The carriage assembly is positioned below the guide assembly at all points during translational movement. The drive assembly includes a spindle bearing connected to the carriage assembly and a spindle arm extending from the spindle bearing and through a side of the cavity for releasably connecting to the mold for rotating the mold through multiple complete 360° rotations in either a clockwise or counterclockwise direction. A cooling system consisting of exhaust fan, air intake damper and water spray is positioned in the cavity for cooling the mold containing the melted resin.

21 Claims, 7 Drawing Sheets

ROTATIONAL MOLDING OVEN

BACKGROUND OF THE INVENTION

1. Field of the Invention

The present invention relates generally to ovens and, more specifically, to a rotational molding oven able to evenly heat and cool a mold filled with resin materials while rotating the mold to manufacture primarily hollow or partial shell objects wherein the resin is evenly distributed throughout the object.

2. Description of the Prior Art

Numerous methods and apparatuses for forming an object have been disclosed in the prior art. On such example is rotational molding. Rotational molding is a method of manufacture for primarily hollow or partial shell shaped plastic objects. This process utilizes a shell mold having a cavity bounded on five sides by the mold. The sixth side of the cavity is formed by a cover attached by clamps or bolts to one of the adjacent sides. When the cover to the mold is open, a powdered (possibly colored) plastic resin is placed into the cavity of the mold. The cover is then sealed to restrict access to the cavity and the mold is placed in a heated environment in which it is rotated about two axes. The heat causes the resin to melt against the heated inside surface of the mold. The melted resin flows within the cavity to form a viscous membrane conforming to the mold's inner surface. The mold (and the plastic inside) is then cooled while rotation continues causing the resin to harden in the shape of the cavity filled thereby.

When the hardened resin is cool enough to handle (normally below 150° F.) the rotation is stopped and the mold is opened. The hardened resin forming a desired part is removed. The part is then trimmed and cut to the form the desired final contour(s) for the part. These parts are generally of uniform wall thickness, colored throughout, and unstressed, i.e. the parts will not deform if subject to cyclical heat or heating/cooling.

The quality of the part produced is dependent on both the heating cycle and the cooling cycle. The heating cycle is divided into four stages. The initial stage is the warm up of the oven interior and mold support structure to a process temperature for the mold shell. This stage is an unproductive time and may contribute to uneven heating patterns which for the most part are undesirable. Generally, the shorter the warm up cycle, the better and more efficient the process. Excessive heat infusion may cause momentary overheating and/or mold distortion. Therefore, time and temperature control is important. Equally important is the uniformity and rate of convective heat transfer, the higher the gas velocity about the mold, the greater the heat transfer and the more uniform the heating of the mold.

The second stage of the heating cycle is attaining the resin melting temperature within the oven. At this stage, the resin is still predominantly in powder form and heat transfer must be maintained at maximum level. The mold wall temperature must be kept below the rapid oxidation temperature or else discoloration (the first indication of burning) or oxidation will occur. High gas velocities are important during this stage to ensure that no portion of the mold is cooler or hotter than the bulk of the mold and that the initial melt of the resin is uniform.

The third stage starts after the resin begins to melt. At the initiation of the third stage, the majority of the resin is in contact with the mold wall and heat transfer has begun to slow down. The mold wall temperature begins to rise, approaching the oven gas temperature. If left unchecked, the resin in contact with the mold wall may start to discolor. At this stage the oven temperature must be reduced. In some systems this reduction is progressive over the heating cycle. Alternatively, in many ovens in use today, the second stage is ignored and the temperature is held at the third stage temperature limits throughout the process. This prevents burning but also slows the process cycle thereby sacrificing speed of production in order to obtain satisfactory quality for the produced part.

The forth stage is the cool down of the mold. In some ovens the cool down is left to nature, e.g. convective air cooling is applied and the mold cools slowly. Heavier and shielded parts of the mold cool slower than lighter unshielded parts. The large exposed sections of the mold cool quickly. Factoring the irregular cooling during this stage of the overall heating cycle into the manufacturing cycle of a part is an inexact art form. Modern ovens use water spray cooling to quickly cool or de-superheat the mold and mold support structure. Preferably, the spray is in the form of a mist. A spray mist provides an enhanced cooling effect which is more uniform and regulated than convective air heating. Excessive cooling such as water deluge will cause uneven shrinkage of the mold and molded part and may damage some molds. When the plastic part inside of the mold is below the melting/viscous point of the resin, the heating stages are complete.

The cooling cycle occurs over three stages. The initial stage is a continuation of the last stage of the heating cycle. The mold and structural support attachments must be cooled to a point where heat flows out of the mold. Since the resin is a poor conductor of heat, the inner surface of the molded part cools much slower than the surface in contact with the mold. As the cooling continues, the part begins to shrink. Shrinkage will cause some portions of the molded part to detach from the mold wall and these areas will now cool slower than the balance of the molded part. This may cause some degree of distortion. In this stage, excessive rate of cooling causes the part to warp.

The second stage of cooling begins when all of the part has cooled and is released from the mold wall. At this point, the temperature of the part is completely below the viscous temperature. The heat transfer rate is at its slowest at this point due to a lack of part-to-mold contact. The part can now be cooled quickly with little fear of increased deformation. An increased use of water spray is the generally accepted procedure for further cooling the part.

The last stage of cooling occurs after the part has cooled to a point where it could be safely removed from the mold. The part may still be soft and additional cooling may help post-molding operations, otherwise the part is complete and is held waiting for operator attention. This stage is therefore non-critical to the overall process. In interconnected, multiple mold systems, this stage is often required so that other molds can be processed.

Rotation of the mold can include either complete revolutions about two axes or complete revolutions about a single axis with partial revolutions about a second axis. The latter type of rotation is called "rock and roll" as the partial revolutions are similar to a cradle being rocked. In both cases, the two axes of rotation are mutually perpendicular and horizontal rotation about the vertical axis is not required.

The method of heating the mold may be either direct or indirect. Direct heating by an open flame or radiant panels is not considered here. Heating by an open flame is a very old technique characterized by uneven heating, a potential for flame impingement and low energy efficiency. The cost of equipment is very low. Direct heating using radiant panels is still under development and presents limitations for molds having complex shapes and/or curvatures.

Indirect heating is performed in an oven and is currently the preferred method used by most of the industry. Using a direct flame inside the oven is a special case and is subject to the same quality limitations for open direct flame methods mentioned hereinbefore. The indirectly heated oven is discussed hereinbelow.

Another type of system is based on bi-axial rotation. Bi-axial rotational systems, i.e. ovens with mold handling mechanisms having two axes of complete rotation, are the most popular commercially made ovens. These ovens provide the most universal rotational patterns and are well suited for a large portion, but not all, of the marketplace. Commercial systems of this type can be either shuttle, clamshell or turret styles.

Systems of the turret type have molds mounted on three or more radially displaced hollow, horizontal arms. The arms, which provide the primary axis of rotation, are typically fitted with a right angle drive head located at the end of the hollow rotating arm and inside the oven. The drive head displaces the molds to the side of, and at right angles to the primary axis of rotation. Bevel gears mounted on shafts with bearings in the drive head, driven by a second shaft positioned inside the hollow rotating arm independently drive the mold about an axis perpendicular to the primary axis of rotation. The drive head operates entirely within the hot oven during the heating cycle.

Two to four molds may be mounted on the drive head depending on design and complexity of the drive head and the size of the molds. However, mold size is limited to a fraction less than half the height of the oven. Therefore, bi-axial ovens tend to be large. Mold volume efficiency is limited to less than one-third (⅓) of the oven volume, to allow for complete rotation of the arm about the primary axis with molds attached. The bi-axial ovens are generally indirectly heated by gas fired burners operating under temperature control.

A shuttle machine carries a single hollow rotating arm having an independently driven drive head at one end similar to that of the bi-axial oven and is able to either manually or automatically extract the mold from the oven. Typically, one set of molds is removed to a remote cooling station while the oven is used by a second shuttle to heat a second set of molds. Two cooling stations are thus required.

Clamshell ovens are typically opened at a center parting line and raised off of or away from the molds following the heating cycle. The cooling cycle occurs in open air. The clamshell ovens thus require a high overhead and front swing clearance. The clamshell ovens are often single use type. However, a clamshell oven can be combined with a shuttle oven.

Turret style ovens are popular due to their ease of automation. The three or more hollow rotating arms of the turret style oven are horizontally supported from a central turret. The arms rotate horizontally, about a vertical axis extending through the center of the turret, into the oven carrying the molds into position for the heating cycle and, after the heating cycle, are again rotated horizontally carrying the molds into the cooling station. The third position of the turret style oven serves as a mold loading and unloading station. Each station occupies 120 degrees of an arc having its center at the turret and an overall radius sufficient to encompass the oven. The turret system can cycle each arm based on pre-programmed conditions thereby relieving operators of the need to attend to every cycle change. Loading and unloading of the molds in a turret system is manual. For turret ovens, seals are far more complicated and subject to more leakage and oven volume efficiency is worse for turret ovens than for the two previously mentioned systems. This is due to the curvature of the mold path, the vertical movement of the doors and the fact that, to provide a completely unobstructed swing path, one side of the furnace is horizontally split such that the top part of the oven is hung from the oven structure.

The horizontal rotation of arms and molds make these units large. The ratio of useable floor space to that required for the molds to clear the process stations is low and therefore a great deal of floor space is required to install even a small system.

Another type of oven is the rock and roll oven. The rock and roll oven rotates the mold about a horizontal primary axis. The entire drive and mold assembly is then rocked through a smaller angle, horizontal and perpendicular to the first axis of rotation. The rock angle can be varied from 1 to 30° above and below the horizontal and angles of up to ±45° can be achieved. For some very long parts such as canoes or kayaks, the angle may be limited to about ±15°. The molds can be directly heated such as in open flame systems. However, direct heated ovens have lower energy efficiency, are subject to poor process control and have largely been replaced by indirect heated oven systems.

Rock and roll ovens were once very popular, especially when plastic processors and custom molders were making their own equipment. Typically rock and roll ovens have fewer parts, a simple mold path, a smaller unit footprint and a lower manufactured cost. Maintenance of the rock and roll oven is easy since the parts were small (e.g. one unit-one mold) the ovens used off-the-shelf low horsepower motors and drives and critical components. All components are easily accessible. However, loading and unloading mechanisms for these ovens were not well defined and subsequently, labor content per part manufactured is high. Furthermore, the product quality and product consistency are often below industry requirements.

Lack of cycle control made part processing parameters vary with ambient temperature at the start of any cycle. This means that parts were generally under processed early in the day in a cold oven and overheated later in the day when the oven became hotter. Heating was uneven and circulation within the ovens had low velocity. Many systems had in-cavity gravity burners which subjected the molded parts to moments of direct flame impingement and moments of low heat and had low thermal efficiency. Furthermore, none of the systems were fully automated and therefore the amount of labor required of an operator was typically high and expensive, especially in a labor limited situation. For these reasons the rock and roll systems have never dominated the marketplace.

Rock and roll ovens have a few advantages over the bi-axial systems which are inherent in the operation. Firstly, most parts can, in fact, be adequately molded in a rock and roll environment and parts which have an axis of symmetry such as cylinders, box shapes and cones and have critical thickness requirements at the top or bottom rims may perform better on a rock and roll system. In bi-axial rotation ovens there is a period during the secondary rotation in which one end of the mold points downward. During this period, the resin collects and stagnates because there is no gravity-induced motion of the resin powder within the mold.

The end of the part in which the resin collects is therefore too heavy. Orienting the part sideways or at an angle to the axis of rotation to overcome this problem places one side of the mold in a less desirable position with regards to heat transfer. The side which faces the mounting hardware will thus be thinner when the process is complete. The heavy section mentioned above is not eliminated but appears in a less conspicuous side wall area. This is not an improvement.

Rock and roll oven systems can be configured to operate in a smaller foot print with lower head room thereby consuming much less factory real-estate. The smaller size of oven means that the buildings housing the ovens can be shorter and smaller thereby reducing plant overhead costs.

The mechanical mechanisms of the rock and roll oven are generally simpler and easier to maintain than those of large bi-axial ovens. The rock and roll ovens generally have smaller motors, starters, gears and drive linkages. Most of the drive devices are located in easy to maintain locations. This translates directly into lower maintenance costs.

In the common turret style bi-axial oven all parameters are fixed. To optimize oven space, multiple molds are mounted but they all must run under the same process conditions. This causes compromises in process cycle time and quality as all cycles pass through the same oven. Smaller parts are processed inefficiently and larger parts can not be processed. The production mix may leave some cycles empty, these must be run empty, in order to keep the other cycles operating.

In the proposed embodiment of the patent, a system of multiple, single cavity ovens, dependence of one mold upon the requirements of any other is eliminated and compromising of individual process parameters is not required. Use of multiple ovens also permits a larger variety of parts to be made at one time. One mold to one oven means that ovens that are not required are not operated, thus, there are no dead cycles or lost energy. A multiple oven system can each be made up of ovens of different sizes and configurations whereby molds of all sizes can be matched to their optimum oven. A smaller total number of large or special ovens reduces the capital investment and saves energy.

The cost to manufacture these ovens is generally low and often several rock and roll ovens can be purchased for the same cost as one large turret style bi-axial system. The rock and roll ovens do not have to be identical, e.g. a mix of sizes, configurations and features will save initial capital investment.

Numerous other types of ovens have also been provided in the prior art. For example, U.S. Pat. Nos. 4,468,172; 4,632,654; 4,767,321; 5,039,297 5,423,248; 5,443,382 and 5,683,240 all are illustrative of such prior art.

U.S. Pat. No. 4,486,172 to Dunning discloses an oven and method of operation for heating thermoplastic articles. Articles are fed into the oven on a conveyor belt. There is a heating plate directly beneath the article bearing surface of the conveyor belt which heats the supported side of the article. The surface of the article not in contact with the bolt is heated by conventional means within the oven.

U.S. Pat. No. 4,632,654 to Dunning discloses rotational molding apparatus and methods for rotationally molding castable material such as polymers and other materials. In one form, a shuttle or wheeled carriage containing a mold fixture for holding one or more molds, which fixture is both pivotable and rotatable on the carriage, is operable to move along a fixed path into and out of an oven and cooling chamber. Two of such mold fixture containing carriages may be automatically moved between the oven and one or more cooling chambers, alternately to permit the oven and cooling chamber or chambers to be operated substantially all of the time during an operating shift. An automatic programming device or computer operates to control the movement of the carriage or carriages into and out of the oven and cooling chamber, the operations of the fixture rotating and pivoting motors and, if utilized, the operation of automatic mold charging equipment, the cooling chamber water pumps, the oven heating elements, mold opening and closing means, molded article removal equipment, etc. In particular form, mold containing carriages alternately move into the oven and cooling chamber along a single track wherein one carriage is either sidetracked or moved to the side of the single track while the other carriage travels between the oven and cooling chamber.

U.S. Pat. No. 4,767,321 to Chilva discloses a method and apparatus for heating fibers reinforced thermoplastic sheets is disclosed. The apparatus involves use of gas heating ovens adapted to allow several layers of material to be heated continuously, with the conveyors stacked are above the other. Stacking of the heated product can be provided at the oven exit. Provisions for cleaning and diffusing the gases over the work piece are also described.

U.S. Pat. No. 5,039,297 to Masters discloses rotational molding apparatus for molding a kayak and the like in a mold. The apparatus includes an oven having an oven chamber. A frame pivotally supports oven above a ground floor. Mold rotates about a roll axis on a carriage while in oven chamber. Oven pivots about a pivot axis in counter-pivotal movement. Oven pivot axis is spaced a distance "d" from roll axis of mold. This causes a pendular motion to be imparted to the mold. Mold thus swings to and fro in an arc as oven pivots. Mold rotates about its roll axis at the same time. A well-controlled, even distribution of plastic material in the mold occurs by this combination of motions. A desired pattern of heat distribution is applied along the length of mold by a series of hot air openings and a like number of openings on an opposing side of a hot air plenum.

U.S. Pat. No. 5,423,248 to Smith et al discloses method and apparatus for heating a product which includes a plurality of tapered ducts in a cabinet above and below a conveyor to form streams which are directed toward the product. Spent air is drawn through return ducts which have intake openings centered between entrance and exit openings in the cabinet and centered between lateral edges of a conveyor and between the tapered ducts to provide a balanced flow of spent air in the cabinet to the return opening. Temperature controlled gas is delivered at an angle through an array of openings adjacent opposite edges of an opening through which a conveyor extends to cause most of the heated air to be drawn to the return duct opening and to maintain internal pressure in the cabinet to prevent ingress and egress of air through the opening.

U.S. Pat. No. 5,443,382 to Tsurumi et al discloses an atmospheric oven containing an atmospheric gas kept at a predetermined purity accommodates a transport for transporting an object to be heated along a predetermined transporting path. A rectangular sectioned tubular body for preventing the gas from flowing outside the oven extends a certain length from an entrance of the oven and an exit of the oven and has a sectional area necessary for passing the object through the tubular body.

U.S. Pat. No. 5,683,240 to Smith et al discloses a method and apparatus for heating a product which includes a plurality of tapered ducts in a cabinet above and below a conveyor to form streams which are directed toward the product. Spent air is drawn through return ducts which have intake openings centered between entrance and exit openings in the cabinet and centered between lateral edges of a conveyor and between the tapered ducts to provide a balanced flow of spent air in the cabinet to the return opening. Temperature controlled gas is delivered at an angle through an array of openings adjacent opposite edges of an opening through which a conveyor extends to cause most of the heated air to be drawn to the return duct opening and to maintain internal pressure in the cabinet to prevent ingress and egress of air through the opening.

While these units may be suitable for the particular purpose to which they address, they would not be as suitable for the purposes of the present invention as heretofore described.

SUMMARY OF THE PRESENT INVENTION

The present invention relates generally to ovens and, more specifically, to a rotational molding oven able to evenly heat and cool a mold filled with resin materials while rotating the mold to manufacture primarily hollow or partial shell objects wherein the resin is evenly distributed throughout the object.

A primary object of the present invention is to provide a rotational molding oven that will overcome the shortcomings of prior art devices.

Another object of the present invention is to provide a rotational molding oven which is able to provide both heating and cooling within a single cavity wherein all cycles begin from the same start-up state with the same preheat cycle thus providing a consistent mechanical and thermal cycle which reduces the number of rejects produced.

A further object of the present invention is to provide a rotational molding oven which is able to provide a short timed period of extra heat input for the preheat cycle and which allows for close control of temperature to a predetermined, variable temperature profile throughout the heating cycle.

A yet further object of the present invention is to provide a rotational molding oven wherein the burner combustion chamber is located external to and to the rear of the oven and provides hot gasses to a plenum located below the cavity and is therefore capable of operating on a variety of fuels.

A still further object of the present invention is to provide a rotational molding oven including an exhaust stack including a volume control damper to control cavity negative pressure and a combustion gas re-circulating fan connected to the combustion chamber to optimize combustion and to reduce tramp air infiltration into the cavity.

A further object of the present invention is to provide a rotational molding oven having an adjoining separately supported drive assembly located to the rear of the cavity for rotating the mold within the cavity about the center of the cavity without vertical translation and wherein all drives and drive train components are external to the cavity.

A further object of the present invention is to provide a rotational molding oven wherein the drive assembly is supported by a carriage which moves up and down along a curvilinear track causing the drive assembly to rotate the mold and which curvilinear track provides for automatic control of the rotational motion including multiple stops and starts at adjustable predetermined tilt angles.

A still further object of the present invention is to provide a rotational molding oven supporting a mold at the center and rotating the mold in centerless fashion about two axes of rotation at the center of the oven wherein the oven will be the least possible size to house the rotating mold.

Another object of the present invention is to provide a rotational molding oven that is simple and easy to use.

A still further object of the present invention is to provide a rotational molding oven that is economical in cost to manufacture.

Additional objects of the present invention will appear as the description proceeds.

A rotational molding oven for forming an object from a mold filled with resin is disclosed by the present invention. The rotational molding oven includes a cavity for retaining the mold, a burner for heating the cavity and melting the resin, a fan for cooling the cavity and hardening the resin, a device for rocking the mold preferably between ±1° and ±45° from a horizontal plane extending through the cavity center and a device for rotating (rolling) the mold about an axis running through the cavity center and perpendicular to the aforesaid axis. The rocking device is positioned outside and extending into the cavity, maintaining the mold in a center of the cavity. The rocking performed by the rocking device provides for axial transport of the resin inside the mold. Rocking the mold at the center of the cavity improves thermal flow of heat within the cavity and around the mold thereby increasing thermal efficiency and minimizing the size of the cavity. The rocking device includes a first track positioned outside the cavity, a carriage assembly to run on the first track, a drive assembly connected to the carriage assembly and a guide assembly connected between the first track and carriage assembly for translating up and down the first track, causing the carriage assembly to move therewith and the mold to rock about the axis through the center of the cavity. The carriage assembly is positioned below the guide assembly and remains below the guide assembly through all points of translational movement. The rotational drive assembly includes a spindle bearing connected to the carriage assembly and a spindle arm extending from the spindle bearing and through a side of the cavity for releasably connecting to the mold for rotating the mold through complete 360° rotations in both a clockwise and counterclockwise direction. A cooling system comprised of a cooling fan, cooling fan inlet damper and cool air inlet damper is also positioned about the cavity for cooling and hardening the melted resin in the mold.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims,

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
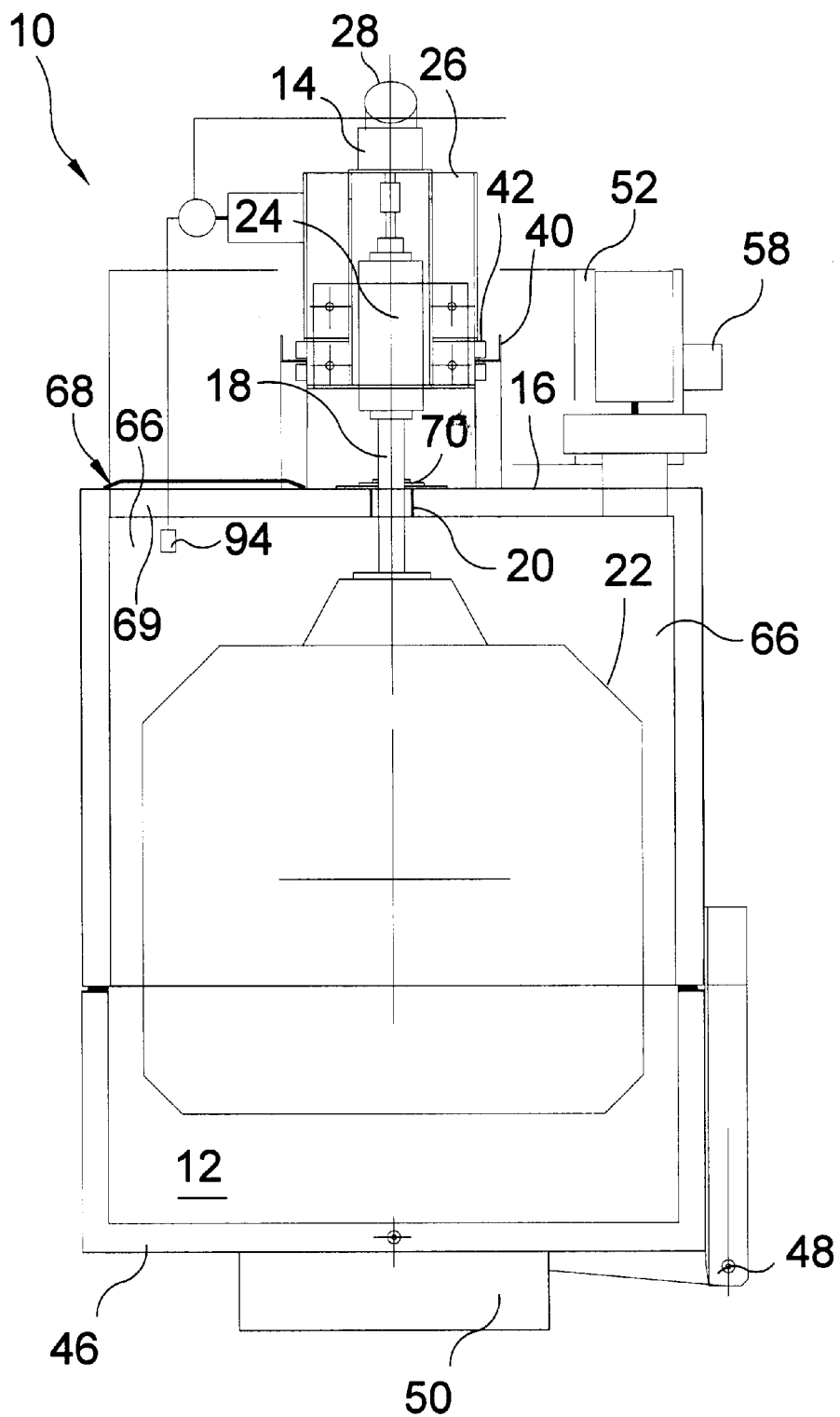
FIG. 1 is a top cross-sectional view of the rotational molding oven of the present invention.

Turning now descriptively to the drawings, in which similar reference characters denote similar elements throughout the several views, the Figures illustrate the rotational molding over of the present invention. With regard to the reference numerals used, the following numbering is used throughout the various drawing figures.

10 rotational molding oven of the present invention
12 cavity
14 drive assembly
16 back wall of cavity
18 spindle arm
20 slotted path in back wall of cavity through which spindle arm extends
21 mold
24 spindle bearing
26 carriage assembly
28 first track
30 guide assembly
32 first set of wheels
34 first side of the first track
36 second set of wheels
38 second side of the first track
40 second track
42 pair of wheels engaging second track
44 vertical lift drive
46 door
48 hinges
50 operator control panel
52 burner chamber
54 hot gas duct
56 lower plenum
58 independently operated gas burners
60 bottom side of the cavity
62 removable dividing screen
64 removable base panel
66 insulated chamber
68 inspection hatch door
69 rectangular access hatchway
70 gas seal
72 exhaust stack
74 stack damper
76 short fan discharge duct
78 combustion air fan
80 short fan intake duct
82 exhaust damper
83 air intake damper
84 exhaust plenum
86 exhaust fan
88 water pump
90 supply piping
92 discharge piping
94 spray nozzle
96 chain
98 first drive wheel
100 second drive wheel
102 extending arm
104 connection point

DETAILED DESCRIPTION OF THE PREFERRED EMBODIMENT

Turning now descriptively to the drawings, in which similar reference characters denote similar elements throughout the several views, FIGS. 1 through 7 illustrate the rotational molding oven of the present invention indicated generally by the numeral 10.

Figure 7:
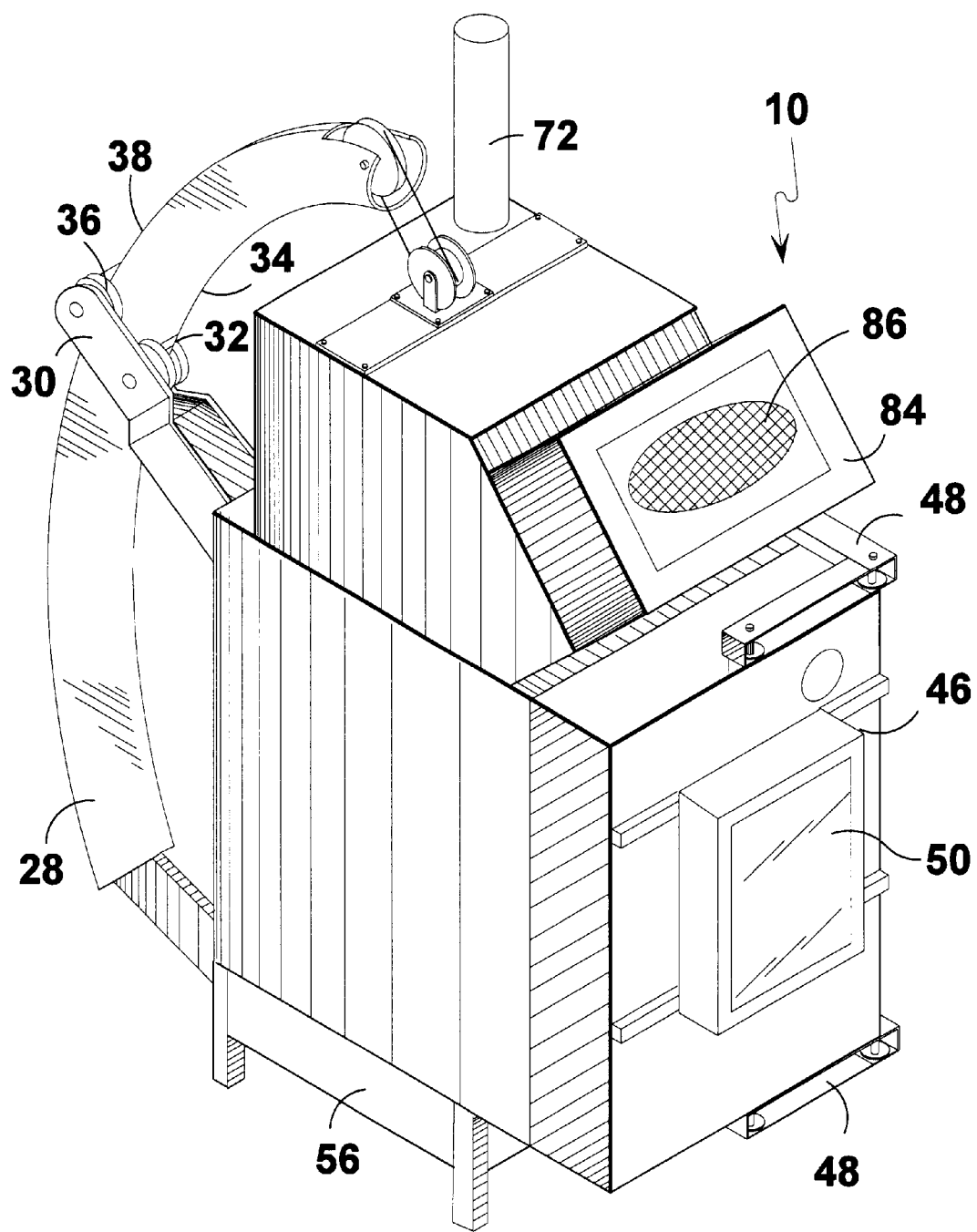
FIG. 7 is a perspective view of the rotational molding oven of the present invention.

A perspective view of the rotational molding oven 10 of the present invention is illustrated in FIG. 7. From the view shown in FIG. 2, the shape of the oven can be seen with a door 46 on one side thereof A drive assembly 14 for rotating a mold 22 and a carriage assembly 26 for rocking the mold 22 are positioned outside a cavity 12 of the rotational molding oven 10 and at a back side thereof The positioning of the drive assembly 14 and carriage assembly 26 outside the cavity 12 provides for more readily accessing these elements to facilitate repair and also prevents the heat within the cavity from affecting their operation.

A top view of the rotational molding oven 10 is shown in FIG. 1. The rotational molding oven 10 includes the cavity 12 with the drive assembly 14 positioned outside the cavity 12 and adjacent the back wall 16 of the cavity 12. The cavity 12 is a single, dual function cavity able to perform the functions of both heating and cooling a mold 22. The cavity 12 is preferably in the form of an elongated cube having a door 46 in the front thereof to provide access to the inside of the cavity 12. The door 46 is pivotally connected to the cavity 12. When the door is opened, it is able to swing fully out of the way of the opening thereby providing greater access to the inside of the cavity 12 as can be seen from FIG. 4.

The drive assembly 14 is positioned outside the cavity 12 where it is isolated from the effects of the cavity 12 which is heated during formation of the part in the mold 22 and is easily accessed when repair or maintenance is required. Positioning of the drive assembly 14 outside the cavity 12 thus reduces costs for maintenance, reduces down time of the rotational molding oven 10 when maintenance is required and increases the life expectancy of the drive mechanisms of the rotational molding oven 10.

The drive assembly 14 has a spindle bearing 24 and a spindle arm 18 extending from the spindle bearing 24 and through a slotted path 20 in the back wall 16 of the cavity 12. The spindle arm 18 is supported by the spindle bearing 24 and restrained against all translational motion and motion about two axes of rotation. The spindle arm 18 is able to be rotated about its longitudinal axis in the clockwise and counterclockwise directions by the spindle bearing 24. The spindle arm 18 holds a mold 22 within the cavity 12 and is rotated by the spindle bearing 24. Rotation of the spindle arm 18 causes the mold 22 connected thereto to also rotate about the longitudinal axis.

Figure 3:
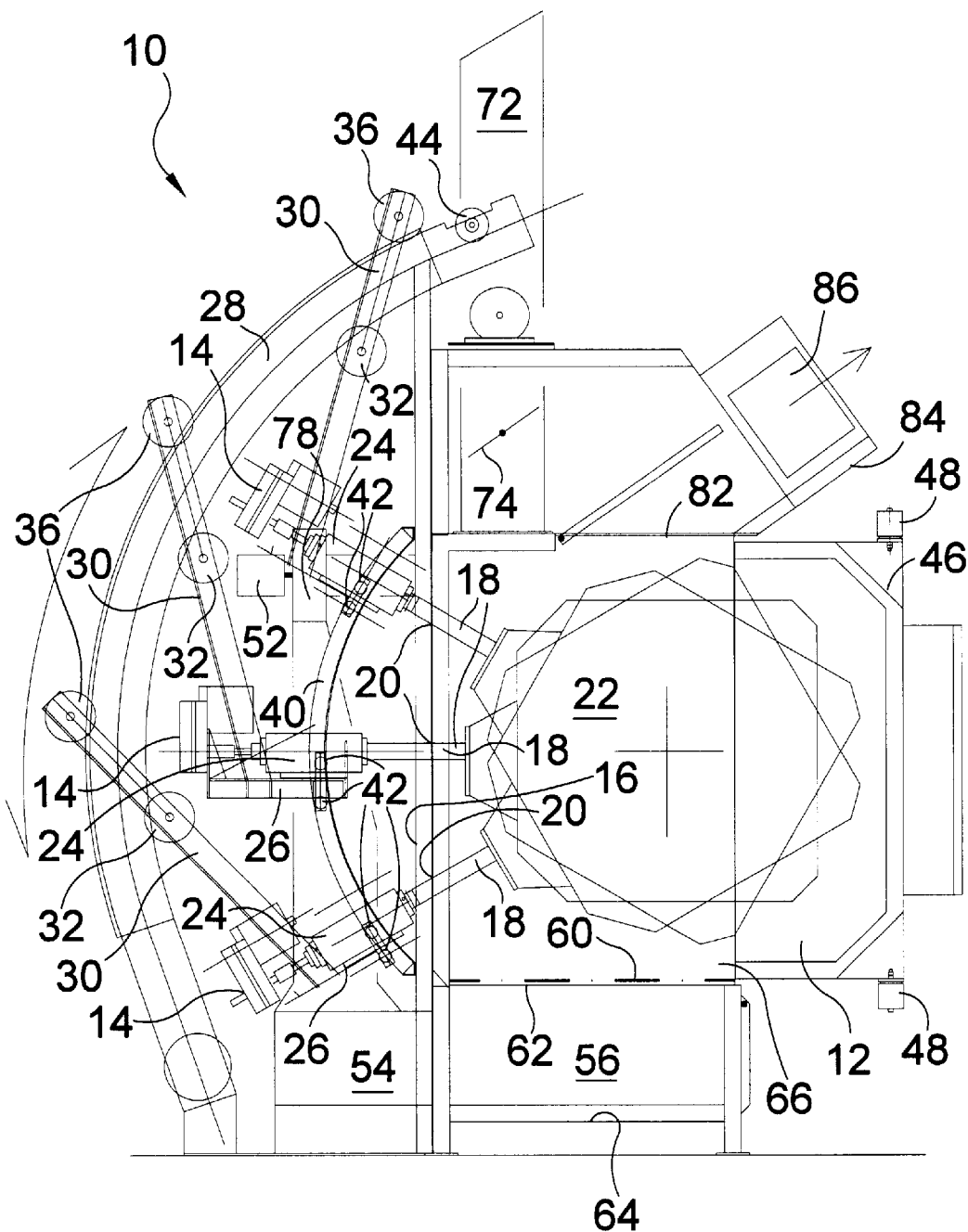
FIG. 3 is a side cross-sectional view of the rotational molding oven of the present invention illustrating movement of the drive assembly for rocking the mold.
Figure 4:
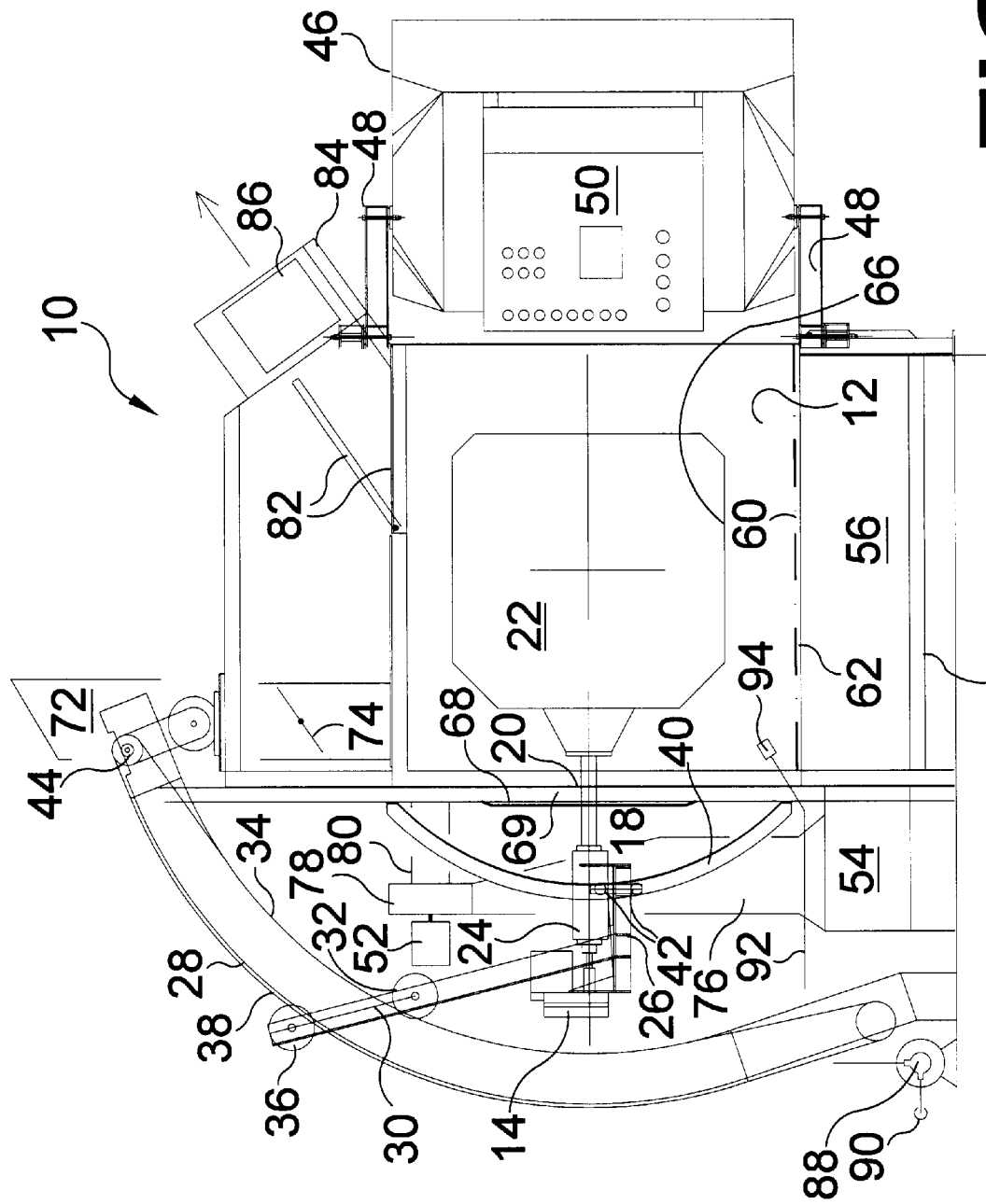
FIG. 4 is a front view of the rotational molding oven of the present invention with the door to the cavity open.

The carriage assembly 26 supports the spindle bearing 24, a double bearing in a single piece machined housing, of the drive assembly 14, in position and is able to translate up and down along a curvilinear path perpendicular to the longitudinal axis of the drive assembly 14 as will be discussed hereinafter with specific reference to FIGS. 2, 3 and 4. The spindle bearing 24 is carried with the carriage assembly 26 as it translates up and down. As a first end of the spindle arm 18 is connected to the drive assembly 14 and passes through the spindle bearing 24, the first end of the spindle arm 18 will also be carried with the carriage assembly 26. As the first end of the spindle arm 18 translates with the carriage assembly 26, it moves along the slotted path 20 in the back wall 16 of the cavity 12. The mold 22 fixed to the second end of the spindle arm 18 does not translate in the upwards or downwards direction but is caused to rotate about an axis extending perpendicular to the longitudinal axis of the spindle arm 18 and through a center of the cavity 12.

Figure 2:
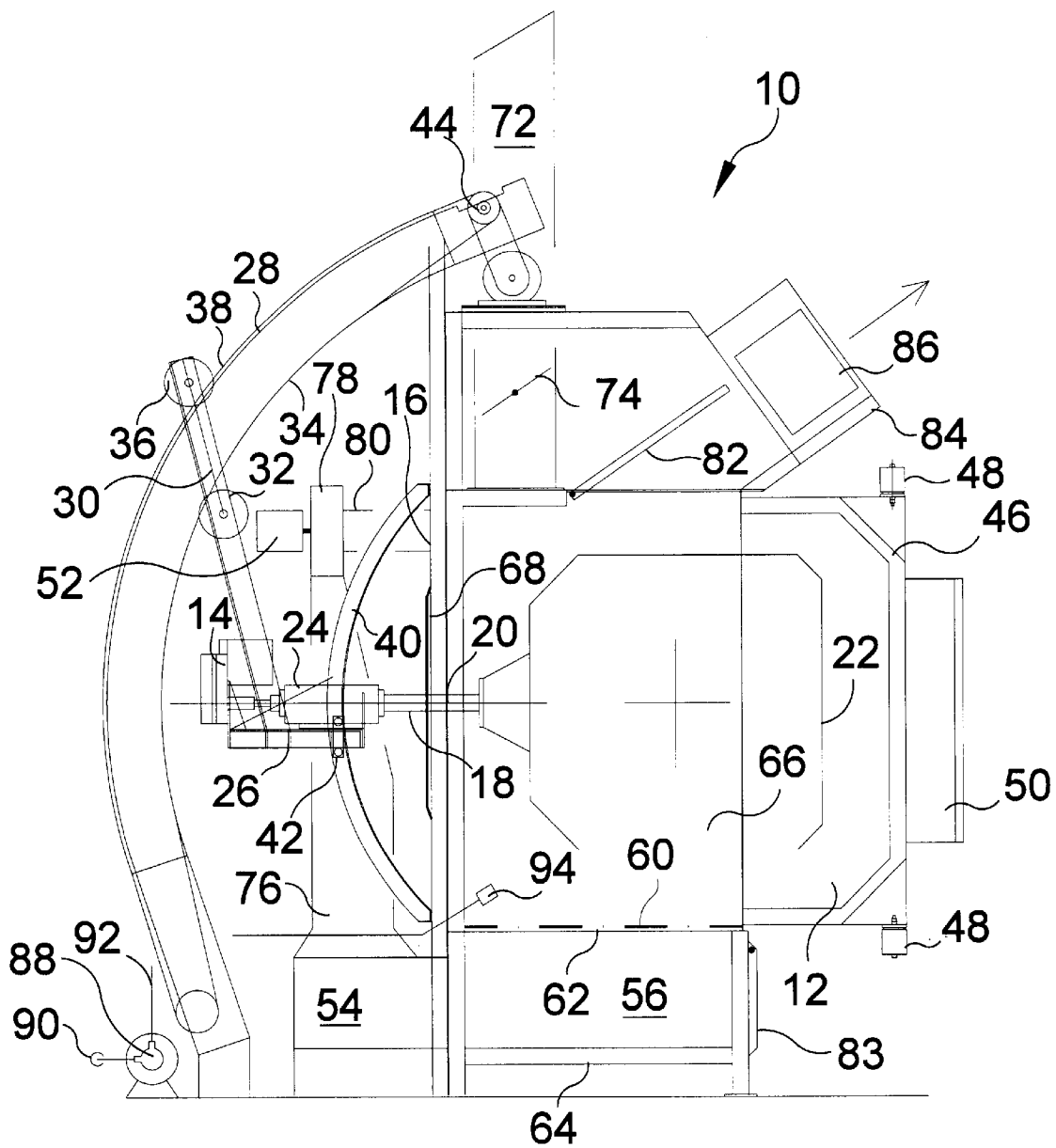
FIG. 2 is a side cross-sectional view of the rotational molding oven of the present invention.

A side cross-sectional view of the rotational molding oven 10 is shown in FIG. 2. This figure illustrates the curvilinear translational path followed by the carriage assembly 26 for rotating the mold 22. This path is perpendicular to the axis about which the mold 22 is rotated by the spindle arm 18. The carriage assembly 26 is moved along the translational path by a guide assembly 30. Translational movement of the carriage assembly 26 and guide assembly 30 as well as rotation of the mold 22 is illustrated in FIG. 3. A first track 28 is positioned on a side of the carriage assembly 26 opposite the cavity 12. The first track 28 is preferably arced and has a center of curvature at the center of the cavity 12. The guide assembly 30 is connected at one end to the carriage assembly 26 and extends toward and on either side of the first track 28. A first set of wheels 32 is rotatably connected to the guide assembly 30 and positioned on a first side 34 of the first track 28. A second set of wheels 36 is also rotatably connected to the guide assembly 30 and positioned on a second side 38 of the first track 28. The guide assembly 30 and the first and second sets of wheels 32 and 36 restrain the carriage assembly 26 to movement along the first path 28. The guide assembly 30 is connected between the carriage assembly 26 and the first track 28 such that the center of gravity of the carriage assembly 26, drive assembly 14, shaft 18 and mold 22 are always positioned below the connection with the first track 28. Thus, at each point during the motion of the guide assembly 30 along the first track 28, the combined center of gravity of the connected load is below the center of the guide assembly and gravity, acting downward, and stabilizes the connection and adds to the stability to the rocking of the mold 22.

A second track 40 is positioned between the carriage assembly 26 and the back wall 16 of the cavity 12 extending on either side of the spindle bearings 24. The second track 40 is preferably curved similarly to the first track 28 and has a center of curvature at the center of the cavity 12. The second track 40 is comprised of two mirror image curved members located on either side of the carriage assembly 26. A pair of wheels 42 are disposed on either side of the carriage assembly 26 and rotatably connected thereto. The pair of wheels 42 engage a respective side of the second track 40 and are able to move along the second track 40. The engagement of the pair of wheels 42 with the second track 40 prevents rotation of the carriage assembly 26 about any vertical axis by preventing deviation of the carriage assembly 26 from its translational path along the first track 28.

A vertical lift drive 44 is connected to the guide assembly 30, causing the guide assembly 30 to move along the first track 28 thereby causing curvilinear movement of the carriage assembly 26 and drive assembly 14 up and down along the first and second tracks 28 and 40, respectively. The resulting movement along the first track 28 of the guide assembly 30 causes translational movement of the spindle bearings 24 and the end of the spindle arm 18 connected to the drive assembly 14 through spindle bearings 24 in the same direction as the guide assembly 30 moves along the first track 28. The spindle arm 18 will thus move along the slotted path 20 in the back wall 16 of the cavity 12. Translation of the spindle arm 18 in this manner causes the mold 22 connected thereto to rotate within the cavity 12 about an axis perpendicular to the spindle arm 18. The angle of rotation of the mold 22 as described above is limited by the length of the first track 28 and slotted path 20 and is preferably less than a full 90° angle, preferably within a range of −45° to +45° from the horizontal axis and will normally be adjusted to suit the type and size of the object being formed.

Positioned outside the cavity 12 near the back wall 16 is a burner chamber 52 for generating heat to be supplied to the cavity 12 as can be seen from FIGS. 1 through 4. The burner chamber 52 may burn any fuel but in this embodiment preferably burns natural gas or propane to provide hot gas for heating the cavity 12 and thus also the mold 22 within the cavity 12. Extending from the burner chamber 52 is a hot gas duct 54 connecting the burner chamber 52 to a lower plenum 56 located on an underside of the cavity 12. The hot gas duct both increases time of combustion to ensure a complete conversion of fuel and blends the combustion gases with recirculation gases to improve uniformity of hot gas temperature before the hot gases enter the lower plenum 56. The burner chamber 52 includes a number of independently operated gas burners 58. Positioned between the lower plenum 56 and the bottom side 60 of the cavity 12 is a removable dividing screen 62. The dividing screen 62 prevents unintended access to the lower plenum 56 and diffuses the hot gasses exiting the lower plenum 56 when the gas burners 58 are operating. The lower plenum 56 is also provided with a removable base panel 64 allowing the lower plenum 56 to be easily cleaned. The removable dividing screen 62 also provides access for readily cleaning the lower plenum 56.

Within the cavity 12 is an insulated chamber 66 having an open front end and an inspection hatch 68 on a back side thereof The inspection hatch 68 includes a rectangular access hatchway 69 extending therethrough. The spindle arm 18 extends through a slotted path 20. The slotted path 20 is fitted with a gas seal 70 for preventing both inward and outward gas leakage.

Extending from a top side of the cavity 12 and above the insulated chamber 66 is an exhaust stack 72. The exhaust stack 72 includes a stack damper 74 therein for controlling pressure within the insulated chamber 66. Connected to the insulated chamber 66 by a short fan intake duct 80 is a combustion air fan 78. The combustion air fan 78 is also connected to the burner chamber 52 by a short fan discharge duct 76. The combustion air fan 78 recirculates air from the cavity 12 thereby improving combustion efficiency and brings the cavity 12 to a neutral pressure.

Located on top of the cavity 12 is an exhaust damper 82. The cooling air exhaust damper 82 is pivotally connected above the cavity 12 for selectively covering the cavity 12. Extending above the cooling air exhaust damper 82 is an exhaust plenum 84 for connecting the cooling air exhaust damper 82 to an exhaust fan 86. The cooling air exhaust damper 82 seals off the cooling fan 86 from drawing cool air through the cavity 12 during the heating cycle and opens to provide high volume air discharge from the cavity 12 during the cooling cycle.

Positioned adjacent the base of and rear of oven 10 is a water pump 88. The water pump 88 is connected to a source of water (not shown) by a supply piping 90. The water pump 88 is further connected to a discharge piping 92 which provides pressurized water from the supply to a spray nozzle 94 located within the insulated chamber 66. The water pump 88 thus can inject a spray of water from the water supply through the spray nozzle 94 and into the interior of the insulated chamber 66 to aid in the cooling process.

Figure 5:
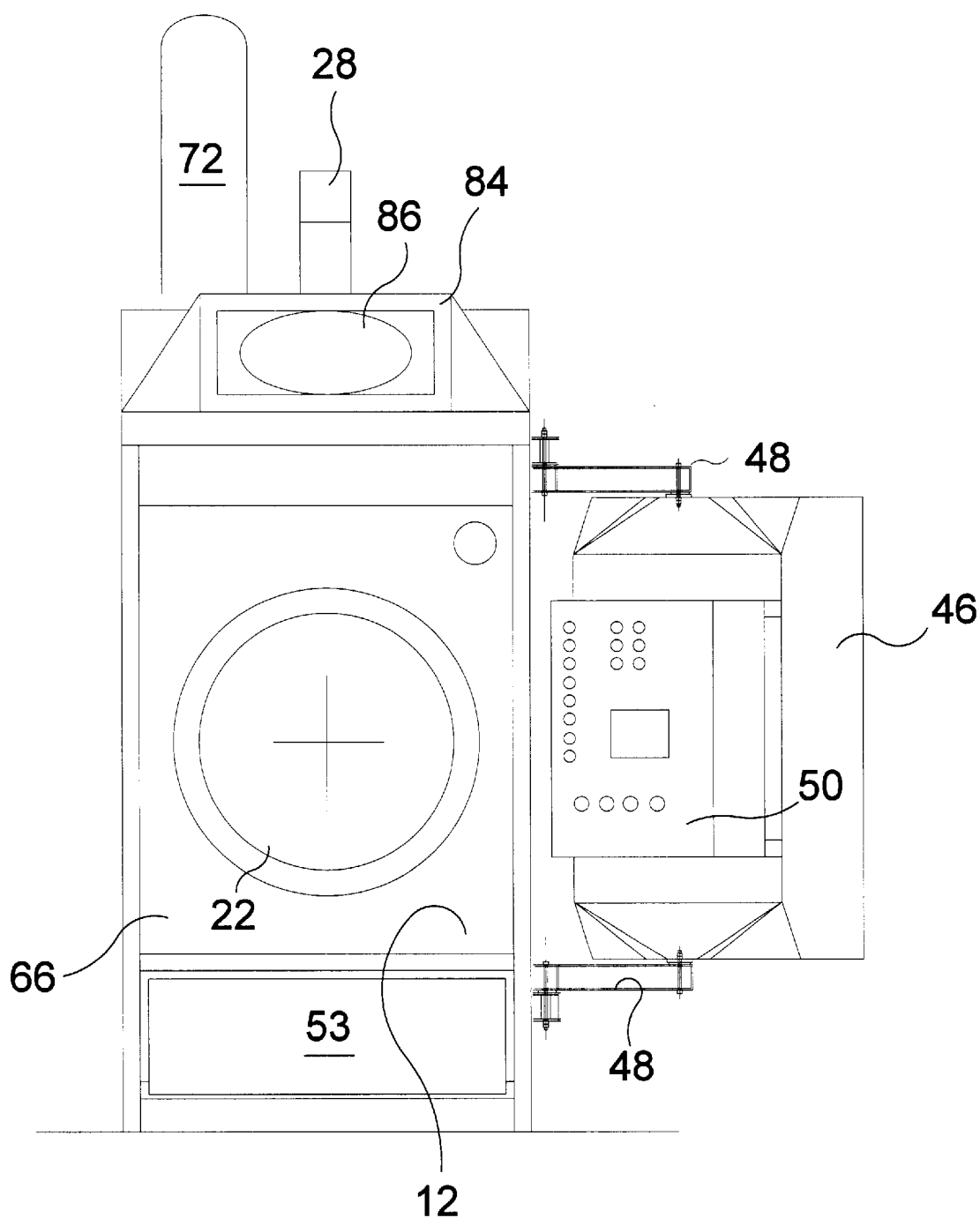
FIG. 5 is a side view of the rotational molding oven of the present invention having a side mounted door in the open position.

FIG. 5 illustrates a side view of the rotational molding oven 10 of the present invention with the door 46 to the cavity 12 in the filly opened position for receiving or removing a mold 22 or unloading a part from mold 22 or charging raw material to the mold 22. The door 46 is shown positioned to a side of the rotational molding oven 10. FIG. 4 illustrates the door 46 in an open position and located on the front side of the rotational molding oven 10. The door 46 is pivotally connected to the cavity 12 by hinges 48 and includes a deep recess therein for providing additional space for a mold 22. The depth of the door recess also improves operator access to the mold 22 while in the cavity 12. Positioned on the door 46 is an operator control panel 50. The control panel 50 is accessible to an operator of the rotational molding oven 10 at all times whether the door 46 is in an open or closed position. The control panel 50 allows the operator to control operation of the rotational molding oven 10. Such operation includes the heating and cooling sequencing of the oven 10, control of the temperature of the oven 10, control of the rotation of the mold 22 in both directions and application of water spray into the cavity 12 during cooling. As can also be seen from this view, an air intake damper 53 is positioned on a side of the lower plenum 56 allowing the intake of cooling air to the lower plenum 56 and into the cavity 12.

Figure 6:
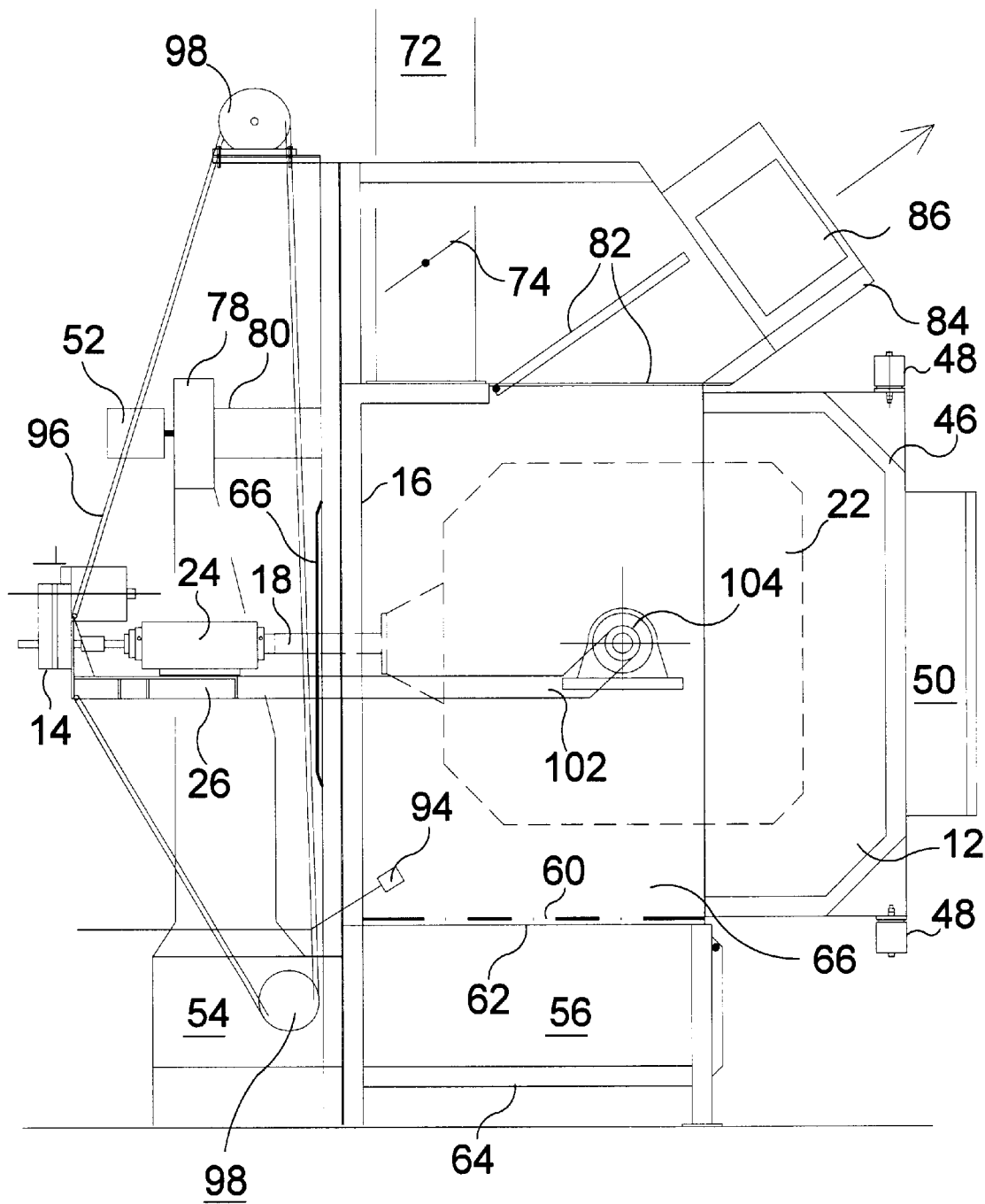
FIG. 6 is a side view of the rotational molding oven of the present invention including an alternate drive assembly for rotating the mold.

An alternate device for moving the carriage assembly in the translational up and down directions for rotating the mold 22 is illustrated in FIG. 6. The spindle arm 18 is supported by the spindle bearings 24 of the roll drive assembly 14 and extends through the slotted path 20 and into the cavity 12. The spindle arm 18 holds a mold 22 in place within the cavity 12 on the end which extends through the slotted path 20. The slotted path 20 is provided with gas seals to prevent gas from entering or leaving the cavity through the slotted path 20. The rocking drive assembly 24 is supported on a carriage assembly 26. A chain or cable 96 is secured at both ends to the carriage assembly 26. The chain 96 is looped around a first drive wheel 98 located near a top side of the rotational molding oven 10 and a second drive wheel 100 located near a bottom side of the rotational molding oven 10. When the first and second drive wheels 98 and 100 are caused to turn, the carriage assembly 26 is caused to move transversely up or down depending on the direction at which the first and second drive wheels 98 and 100 turn. If the first and second drive wheels 98 and 100 turn clockwise, the carriage assembly 26 will move transversely upward and if the first and second drive wheels 98 and 100 turn counterclockwise, the carriage assembly 26 will move transversely downward. Extending from the carriage assembly 26 is a pair of rocker arms 102 on either side thereof The rocker arm 102 extends on either side of the oven 10 and is releasably secured to the oven 10 at a centrally located connection point 104 of the side of oven 10. When the carriage assembly 26 is caused to move transversely, the rocker arms 102 will cause the carriage assembly, with drive assembly 24, spindle arm 18 and mold 22, to rotate about the center of the cavity 66. The pivoting motion of the mold 22 is limited by the angle traversed by the carriage assembly 26 as it moves transversely upward and downward. Furthermore, the extending arms 102 prevent the mold 22 from lateral movement.

The operation of the rotational molding oven 10 will now be described with reference to the figures. In operation, the rotational molding oven 10 is placed in a desired location for forming a desired object from a mold 22. The mold 22 is placed in the cavity 12 of the rotational molding oven 10 where it is held in a central location releasably secured to the spindle arm 18 which extends into the cavity 12 through a slotted path 20 in the back wall 16. The mold 22 is then filled with a resin material. The object is now ready to be formed in the rotational molding oven 10.

At this point, the door 46 to the cavity 12 is pivoted into the closed position and locked shut. The user will then activate the rotational molding oven 10 using the control panel 50. The process is initiated by preheating the rotational molding oven 10. During the preheating of the rotational molding oven 10, the gas burners 58 within the burner chamber 52 are turned on to produce heat by burning hydrocarbon fuel. The heat is provided to the cavity 12 via the hot gas duct 54 and through the lower plenum 56. The heat passing into the lower plenum 56 will pass through the removable dividing screen 62 in the bottom side 60 of the cavity 12 and into the cavity 12. The heat entering the cavity 12 will cause the temperature within the cavity 12 to rise. The preheating stage will continue until the temperature within the cavity 12 reaches a desired value.

At the time when the temperature within the cavity 12 reaches the desired preheat value, the heating stage will begin. In this stage, the mold 22 is held at a temperature at which the resin contained therein will melt over time and flow in a viscous manner. During this stage, the rocking and the rolling of the mold 22 will occur in order to move the powdered resin around the inside of the mold 22 and in contact with all sides of the inside of the mold 22. The hot sides of the mold 22 will melt the resin particles which come into contact with the sides and cause the particles to turn viscous and blend with adjacent particles forming, over time, a continuous layer of viscous resin on the inside surfaces of mold 22. The rocking and rolling of the mold 22 in the manner performed by this rotational molding oven 10 will evenly distribute the resin throughout the mold 22 and thereby produce an object which is properly weighted.

The rocking action takes place about an axis located in the center or the cavity 12 thereby minimizing the size of the cavity 12. Decreasing the size of the cavity 12 will constrain the flow of hot bases around the mold 22, increasing turbulence, and therefore heat transfer rate and uniformity of heating. Improved heat transfer will reduce the energy costs and provide for a shorting heating cycle. Smaller oven size will permit a more efficient use of manufacturing space. Lower investment in production space is possible by decreasing the physical size of the rotational molding oven 10 needed for producing a desired object.

During all active part forming stages, namely preheat, heating and cooling, the drive assembly 14 will activate the spindle bearings 26 to rotate the spindle arm 18. The spindle arm 18 will be controlled to rotate about an axis extending therethrough. The rotation of the spindle arm 18 will alternately be in one of the clockwise or counterclockwise direction. The direction of rotation is periodically reversed to improve uniformity of resin distribution. The spindle arm 18 makes full 360° rotations and is restrained against motion in all other directions. This allows the powered resin to become evenly distributed throughout the mold 22 without being retained in one place for an extended period. During the heating stage the combustion fan 78 is operating to recirculate combustion gas and air to improve combustion quality and recirculate the air within the cavity 12 thereby maintaining a neutral pressure within the cavity 12. Neutral oven internal pressure results in lower leakage of gas out of the cavity 12 and eliminates cold drafts within the cavity 12 due to air infiltration. The fan 78 will lower the gas consumption by recycling preheated gas through the burners and back into the oven 10.

The vertical lift drive 44 operates during all active part forming stages. The vertical lift drive 44 is connected to the carriage assembly 26 and causes the carriage assembly 26 to move laterally up and down along the first and second tracks 28 and 40, respectively. The vertical lift drive 44 will cause the first and second sets of wheels, 32 and 36, respectively, of the guide assembly 30 to move upward and downward along the first and second tracks 28 and 40. As the guide assembly 30 moves along the first and second tracks 28 and 40, it carries the carriage assembly 26 and the drive assembly 14 with it. When the guide assembly 14 moves transversely, it will carry a first end of the spindle arm 18 with it. The second end of the spindle arm 18 is connected to the mold 22 and causes the mold 22 to rock about an axis perpendicular to the direction in which the spindle arm 18 extends. As the spindle arm 18 moves transversely up and down, it moves along the slotted path 20 cut into the back wall 16 of the cavity 12. The slotted path 20 includes a gas seal 70 to prevent gas from leaking out of the cavity 12 during the heating step. The length of the first and second tracks 28 and 40 and the distance the guide assembly 30 travels along the first and second tracks 28 and 40 determines the amount of rocking imparted to the mold 22. Preferably, the mold 22 will rock about a maximum arc of 60° or ±30° from the horizontal plane of the rotational molding oven 10. The arc traversed by the guide assembly 30 when traversing the first and second tracks is set by the operator and is directed by the size and shape of the object to be produced. The rocking motion imparted to the mold 22 will further aid in distributing the powdered resin throughout the mold 22. The second track 40 and guide wheels 42 will prevent the spindle arm 18 and thus the mold 22 from lateral rotation about a vertical axis during rocking.

Once the resin has been evenly distributed and fully melted throughout the mold 22, it is time to begin the cooling step. While the rocking action and rolling action described above continue the air exhaust fan 86 is turned on and dampers 82 and 83 are opened to draw hot gases out of the cavity 12, through the exhaust damper 82 and exhaust duct 84. At this time the water pump 88 is also activated to draw water from a water supply through supply piping 90. This water is provided through discharge piping 92 and to a spray nozzle 94 located within the cavity 12. The spray nozzle 94 will create a mist of water which will impinge on the mold 22 acting to cool the mold 22. Pump 88 may be operated continuously or intermittently as required for optimum part production.

The combustion chamber ducting 59 located at the rear of the cavity 12 allows for clean uniform distribution of the combustion gas which will control the temperature of the oven, improve the heat distribution and prevent burning of the mold. The single cavity 66 for the heating and cooling cycles eliminates the requirement for intervention of either an operator or special mold handlers for handling the mold between cycles and reduces the real estate required for the oven as only a single unit is needed to produce the object. This reduces labor costs and equipment costs for handling and producing the objects. Furthermore, the single cavity is easily sealed and has limited air leakage which permits control of the cavity pressure and reduces heat loss. An installation of multiple single cavity ovens allows ovens of different sizes to be used providing for a greater range of molding capability and flexibility as each oven is required to produce only one object. This reduces scheduling conflicts with parts of different sizes, wall thickness, resin types and other variables which affect the stages of production.

The door is built with a deep cavity which permits recessing the door to oven junction. This provides improved mold access and improved reach into the oven to access the clamps and vents therein. The additional space provided by the recessed door for housing the mold decreases the apparent depth into the oven that the mold is positioned. This permits faster turnaround times, parts manufacturing, cycle times, lower process labor consumption and safer access to the mold for placement and removal. As all the molds, including installation hardware, are normally balanced by design, smaller motors are required for rocking and rolling the mold. This provides for lower operating and maintenance costs. Furthermore, as the motors are small and the space of the ovens is efficiently used the manufactured cost of the oven, the shipping weight and the installation costs are greatly reduced over other ovens. Minimal set up is required.

From the above description it can be seen that the rotational molding oven of the present invention is able to overcome the shortcomings of prior art devices by providing a rotational molding oven which is able to provide both heating and cooling in a single cavity wherein all cycles begin from the same cold state with the same preheat cycle thus providing a consistent thermal cycle which reduces the number of rejects produced. The rotational molding oven is able to provide extra heat input for the preheat cycle and allows for close temperature control throughout the heating cycle. The rotational molding oven includes a combustion chamber located to the rear of the oven cavity for providing hot gasses to a plenum located below the cavity, an exhaust stack including a volume control damper and a combustion air re-circulating fan on top of the cavity. The rotational molding oven also includes an adjoining separately supported drive assembly located to the rear of the cavity for rotating the mold within the cavity about an axis located at the center of the cavity, the drive assembly being supported by a carriage which moves up and down along a track causing the drive assembly to rotate the mold. Furthermore, the rotational molding oven of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A rotational molding oven for forming a object from a mold filled with resin, said rotational molding oven comprising:
   a) a cavity in which the mold is retained;
   b) means for heating the cavity to melt the resin within the mold; and
   c) means for rocking and rotating said mold about two mutually perpendicular axes extending through a center of said cavity, said rocking and rotating means being positioned outside of said cavity and extending through a wall of said cavity to maintain the mold in a center of said cavity, wherein rocking of the mold by said rocking means minimizes the displacement of the mold which permits the cavity to be at a least possible size and which improves contact with the hot gases flowing around the mold which in turn improves thermal flow of heat within said cavity thereby increasing thermal efficiency and minimizing the size of the oven, wherein said rocking means includes:
      i) a first track positioned outside said cavity;
      ii) rotating drive means extending through a wall of said cavity, the mold being releasably connected to a second end of said drive means, said drive means maintaining the mold in the center of said cavity and
      iii) guide means connected between said first track and a first end of said rotating drive means for translating up and down said first track, causing said drive means to move therewith, wherein translational movement of said rotating drive means causes the mold to rock about the axis extending through the center of said cavity.

2. The rotational molding oven as recited in claim 1, wherein a center of gravity of said drive means is positioned below a center of said guide means at all points during translational movement of said guide means along said first track.

3. The rotational molding oven as recited in claim 2, wherein said drive means includes a carriage assembly and a rotating drive assembly connected to said carriage assembly.

4. The rotational molding oven as recited in claim 3, wherein said drive assembly includes a spindle bearing connected to said carriage assembly and a spindle arm extending from said drive means and through said spindle bearing and through a side of said cavity for releasably connecting to the mold.

5. The rotational molding oven as recited in claim 4, wherein said drive means is able to rotate said spindle arm and the mold in either a clockwise or counterclockwise direction, perpendicular to the axis about which the mold is rocked.

6. The rotational molding oven as recited in claim 1, wherein said guide means includes a guide bar connected to said drive means and extending towards said first track, a first set of wheels rotatably connected to said guide bar on a side of said guide bar opposite said connection with said drive means, said first set of wheels engaging a first side of said first track and movable along said first side of said first track.

7. The rotational molding oven as recited in claim 6, wherein said guide means further includes a second set of wheels rotatably connected to said guide bar on a side of said guide bar opposite said connection with said drive means, said second set of wheels engaging a second side of said first track and movable along said second side of said first track.

8. The rotational molding oven as recited in claim 7, wherein said guide means further includes a second track positioned between said drive means and said cavity and a pair of wheels connected between said second track and said drive means for guiding said drive means along said second track.

9. The rotational molding oven as recited in claim 1, wherein said means for heating further includes a burner fan for recirculating heated air from within said cavity thereby improving a combustion efficiency, energy efficiency of said oven and balancing pressure within said oven.

10. The rotational molding oven as recited in claim 1, further comprising means for cooling the melted resin in the mold.

11. The rotational molding oven as recited in claim 10, wherein said means for cooling includes an exhaust fan for drawing heat out of said cavity after heating of the resin.

12. The rotational molding oven as recited in claim 10, wherein said means for cooling further includes a water pump for pumping water from a supply and a spray nozzle connected to said water pump and positioned within said cavity for providing a spray mist within said cavity of water pumped by said water pump, said spray mist acting to cool the mold and the hot resin in the mold.

13. The rotational molding oven as recited in claim 1, wherein said rocking means is comprised of two support arms rotationally fixed to the sides of the cavity, a carriage assembly fixed to and joining the support arms and a rotational drive means fixed to the carriage assembly.

14. The rotational molding oven as recited in claim 13, wherein said rocking means includes a first drive wheel positioned on a top outer side of said cavity, a second drive wheel positioned on a bottom outer side of said cavity and a drive line looped around said first and second drive wheels, said drive line having a first end connected to one side of said rocking means and a second end connected to an opposite side of said rocking means wherein when said drive wheels are rotated, said drive line causes said rocking means to move rotationally up or down.

15. The rotational molding oven as recited in claim 1, further comprising an insulated chamber positioned within said cavity for improving retention of heat in said cavity.

16. The rotational molding oven as recited in claim 1, further comprising a plenum positioned on a bottom side of said cavity for supplying heat from said heating means to said cavity.

17. The rotational molding oven as recited in claim 16, farther comprising a dividing screen positioned between said plenum and said cavity for preventing unintended access to said plenum through said cavity and for diffusing hot gasses passing to said cavity from said plenum.

18. The rotational molding oven as recited in claim 17, further comprising a base panel selectively covering a side of said plenum for providing access to said plenum and facilitating cleaning of said plenum.

19. The rotational molding oven as recited in claim 5, wherein said spindle bearing and spindle arm rotate the mold through a multiple of complete 360° rotations in both the clockwise and counterclockwise directions.

20. The rotational molding oven as recited in claim 1, wherein said drive means rocks the mold through at most a 90° angle.

21. The rotational molding oven as recited in claim 20, wherein the angle through which the mold is rocked is between −45° and 45° from a horizontal plane extending through the center of said cavity.

* * * * *